(12) United States Patent
Naito

(10) Patent No.: US 10,629,936 B2
(45) Date of Patent: Apr. 21, 2020

(54) FUEL CELL STACK

(71) Applicant: HONDA MOTOR CO., LTD., Tokyo (JP)

(72) Inventor: Hideharu Naito, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 188 days.

(21) Appl. No.: 15/683,785

(22) Filed: Aug. 23, 2017

(65) Prior Publication Data

US 2018/0062194 A1 Mar. 1, 2018

(30) Foreign Application Priority Data

Aug. 24, 2016 (JP) .................................. 2016-163813

(51) Int. Cl.
| | | |
|---|---|---|
| H01M 8/2475 | (2016.01) | |
| H01M 8/248 | (2016.01) | |
| H01M 8/2404 | (2016.01) | |
| H01M 8/241 | (2016.01) | |
| H01M 8/2485 | (2016.01) | |

(52) U.S. Cl.
CPC ......... *H01M 8/2475* (2013.01); *H01M 8/241* (2013.01); *H01M 8/2404* (2016.02); *H01M 8/248* (2013.01); *H01M 8/2485* (2013.01); *H01M 2250/20* (2013.01); *Y02P 70/56* (2015.11); *Y02T 90/32* (2013.01)

(58) Field of Classification Search
CPC .. H01M 8/2475; H01M 8/248; H01M 8/2485; H01M 8/2404
See application file for complete search history.

(56) References Cited

U.S. PATENT DOCUMENTS

2004/0258977 A1* 12/2004 Frank .................... H01M 8/008
429/469
2016/0254563 A1* 9/2016 Sato ....................... H01M 8/248
429/469

FOREIGN PATENT DOCUMENTS

| JP | 2000-123857 | | 4/2000 |
|---|---|---|---|
| JP | 2001006715 | * | 1/2001 |
| JP | 2001006715 A | * | 1/2001 |

(Continued)

OTHER PUBLICATIONS

Japanese Office Action for corresponding JP Application No. 2016-163813, dated Feb. 6, 2018.

*Primary Examiner* — Ula C Ruddock
*Assistant Examiner* — Thomas H. Parsons
(74) *Attorney, Agent, or Firm* — Mori & Ward, LLP

(57) ABSTRACT

A fuel cell stack includes a cell laminate, a casing, a first fastening member, a second fastening member, a first seal member, and a second seal member. The cell laminate includes fuel cells stacked in a stacking direction. The casing accommodates the cell laminate. The casing includes a first end plate, a second end plate, and a connecting member. The first end plate and the second end plate sandwich the cell laminate in the stacking direction. The connecting member is arranged between the first end plate and the second end plate. The first fastening member connects the first end plate and the connecting member. The second fastening member connects the second end plate and the connecting member. The first seal member is provided between the first end plate and the first fastening member. The second seal member is provided between the second end plate and the second fastening member.

11 Claims, 10 Drawing Sheets

(56) References Cited

FOREIGN PATENT DOCUMENTS

| | | | |
|---|---|---|---|
| JP | 2000123857 | * | 4/2009 |
| JP | 2014-216269 | | 11/2014 |
| JP | 2016-051686 | | 4/2016 |

* cited by examiner

FUEL CELL STACK

CROSS-REFERENCE TO RELATED APPLICATIONS

The present application claims priority under 35 U.S.C. § 119 to Japanese Patent Application No. 2016-163813, filed Aug. 24, 2016. The contents of this application are incorporated herein by reference in their entirety.

BACKGROUND OF THE INVENTION

Field of the Invention

The present invention relates to a fuel cell stack.

Discussion of the Background

The fuel cell stack mounted on a vehicle or the like has a cell laminate and a casing accommodating the cell laminate therein (for example, see Japanese Patent Application Laid-Open Publication No. 2014-216269 below).

The cell laminate is formed by stacking a plurality of unit cells. The unit cell is provided with a membrane electrode assembly (MEA) configured such that a solid polymer electrolyte membrane is held between an anode electrode and a cathode electrode from both sides and separators between which the membrane electrode assembly is sandwiched.

The casing has a pair of end plates for holding the cell laminate from both sides in the stacking direction, connection bars which extend between the pair of end plates, and side panels which surround a circumference of the cell laminate in the direction orthogonal to the stacking direction.

The end plates and the connection bars are fastened by fastening members in a face to face relation with each other in the stacking direction of the cell laminate.

In the above-referred fuel cell stack, a hydrogen gas as a fuel gas is supplied to the anode electrode, and air as an oxidant gas is supplied to the cathode electrode. Thereby, a hydrogen ion generated at the anode electrode by catalytic reaction penetrates the solid polymer electrolyte membrane and moves to the cathode electrode, so that it causes electrochemical reaction with oxygen in air at the cathode electrode thereby to generate electric power.

SUMMARY

According to one aspect of the present invention, a fuel cell stack includes a cell laminate, a casing, a fastening member, and a seal member. A plurality of fuel cells is stacked in the cell laminate in a first direction. The casing accommodates the cell laminate. The casing has a pair of end plates which holds the cell laminate from both sides in the first direction and a connecting member which extends between the pair of end plates. The fastening member fastens the end plates and the connecting member in the first direction. The seal member is provided on an outer end surface of the end plate located on an opposite side of the cell laminate in the first direction so as to provide a seal between the outer end surface and the fastening member.

According to another aspect of the present invention, a fuel cell stack includes a cell laminate, a casing, a first fastening member, a second fastening member, a first seal member, and a second seal member. The cell laminate includes fuel cells stacked in a stacking direction. The casing accommodates the cell laminate therein. The casing includes a first end plate, a second end plate, and a connecting member. The first end plate and the second end plate sandwich the cell laminate therebetween in the stacking direction. The connecting member is arranged between the first end plate and the second end plate. The first fastening member connects the first end plate and the connecting member. The second fastening member connects the second end plate and the connecting member. The first seal member is provided between the first end plate and the first fastening member. The second seal member is provided between the second end plate and the second fastening member.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
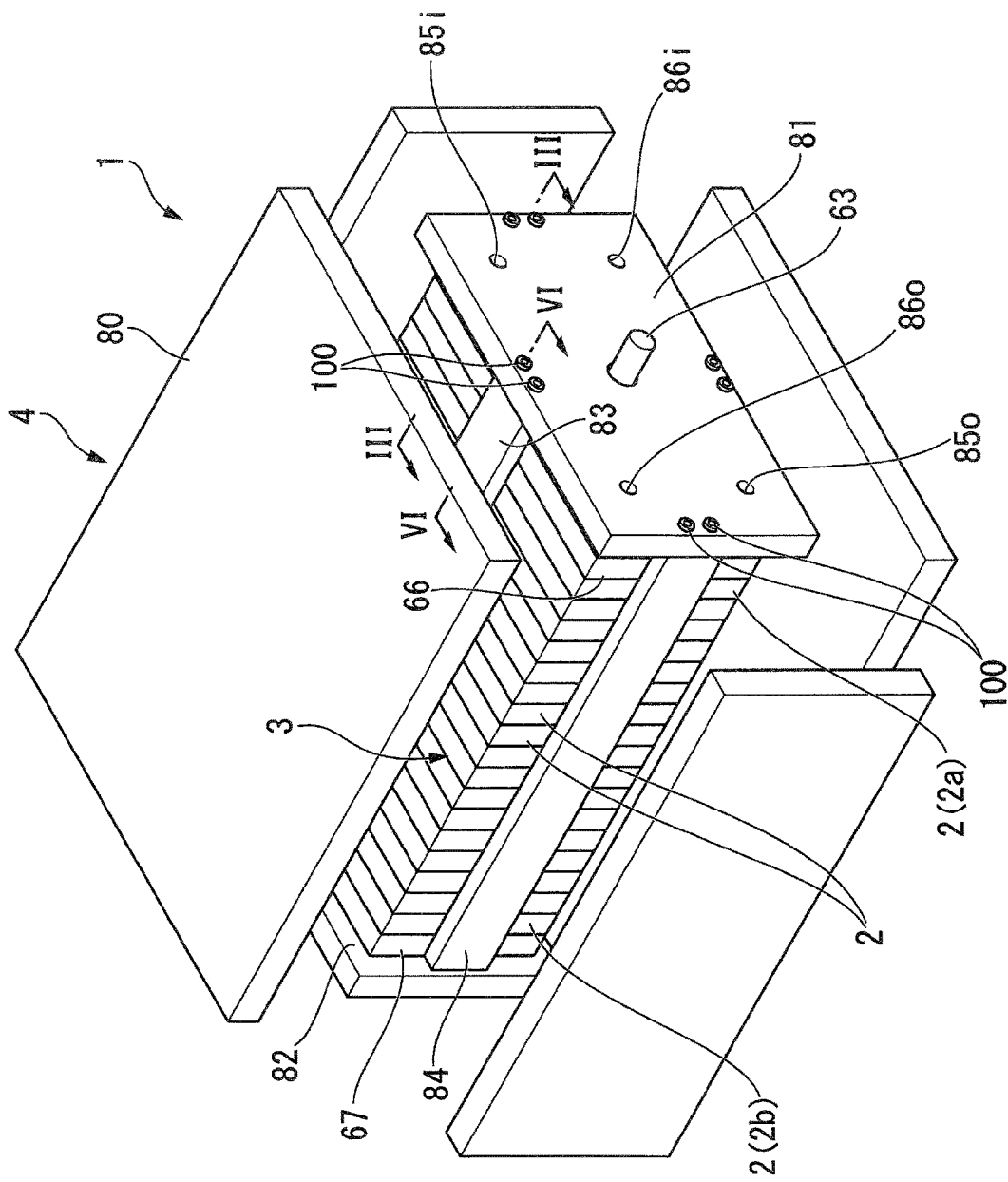
FIG. 1 is an exploded perspective view of a fuel cell stack of an embodiment when viewed from a first end plate side.

The embodiments will now be described with reference to the accompanying drawings, wherein like reference numerals designate corresponding or identical elements throughout the various drawings.

An embodiment of the present invention will be described with reference to accompanying drawings hereunder.

[Fuel Cell Stack]

FIG. 1 is an exploded perspective view of a fuel cell stack 1 of the embodiment when viewed from the side of a first end plate 81. As shown in FIG. 1, a fuel cell stack 1 according to the embodiment of the present invention is mounted on a motor room or an underside of a floor defined in a front part of a vehicle which is not shown in the drawing. The fuel cell stack 1 is used for supplying electric power to a driving motor, for example. In addition, the fuel cell stack 1 of this embodiment is mounted on the vehicle in such a condition that the A direction (first direction) in the drawing is a width direction of the vehicle, the B direction is a forward and rearward direction of the vehicle, and the C direction is an upward and downward direction of the vehicle.

The fuel cell stack 1 is provided mainly with a cell laminate 3 and a casing 4 for housing the cell laminate 3 therein.

The cell laminate 3 is configured by stacking a plurality of unit cells (fuel cells) 2 in the A direction. Herein, in the following description, in the A direction, the B direction and the C direction as referred to above, the direction approaching a center part of the cell laminate 3 may be designated as an inside and the direction separated away from the center part of the cell laminate 3 may be designated as an outside.

<Unit Cell>

Figure 2:
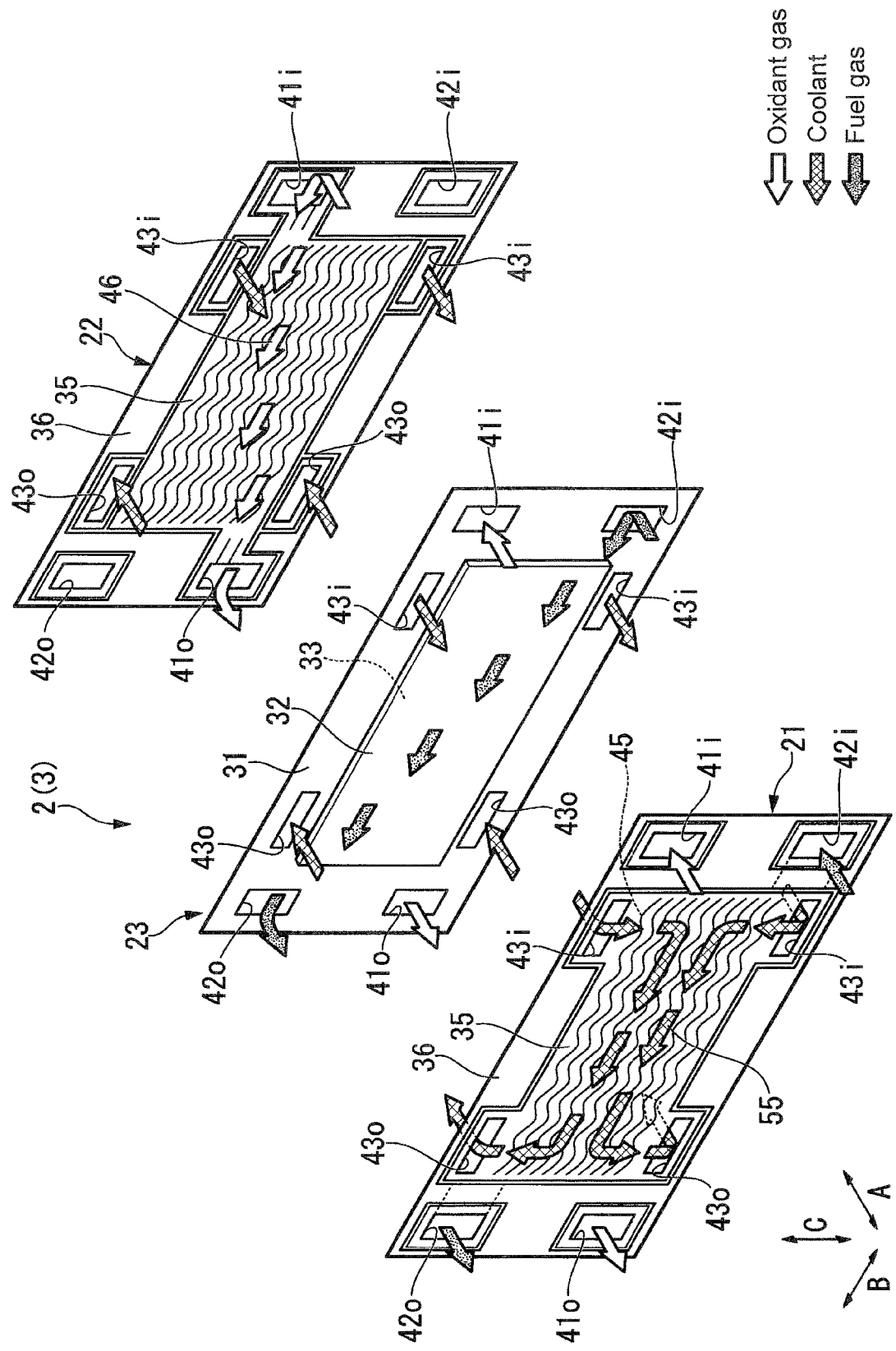
FIG. 2 is an exploded perspective view of a unit cell as shown in FIG. 1.

FIG. 2 is an exploded perspective view of the unit cell 2. As shown in FIG. 2, the unit cell 2 is provided, for example, with a pair of separators 21, 22, and a membrane electrode assembly 23 (hereinafter, referred to simply as MEA 23) held between each of the separators 21, 22. The MEA 23 is provided with a solid polymer electrolyte membrane 31, an anode electrode 32 and a cathode electrode 33 which hold the solid polymer electrolyte membrane 31 from both sides in the A direction. The anode electrode 32 and the cathode electrode 33 have a gas diffusion layer formed of a carbon paper and the like and an electrode catalyst layer formed by uniformly applying porous carbon particles on surfaces of which platinum alloy is carried, to a surface of the gas diffusion layer.

The solid polymer electrolyte membrane 31 is made of a material impregnating a perfluorosulfonic acid polymer with water, for example. The solid polymer electrolyte membrane 31 is larger in external form in a front view as seen in the A direction, than the anode electrode 32 and the cathode electrode 33. In an example of FIG. 2, the anode electrode 32 and the cathode electrode 33 are superimposed in the center part of the solid polymer electrolyte membrane 31. An outer peripheral part of the solid polymer electrolyte membrane 31 protrudes in the form of a frame from the anode electrode 32 and the cathode electrode 33.

Each of the separators 21, 22 of the unit cell 2 is a first separator 21 which is arranged on the side of the anode electrode 32 of the MEA 23 and a second separator 22 which is arranged on the side of the cathode electrode 33 of the MEA 23. Herein, in the following description, with respect to each of the separators 21, 22, like elements are given like reference numerals and described collectively.

Each of the separators 21, 22 has a separator plate 35 and a cover member 36 which covers an outer peripheral part of the separator plate 35.

The separator plate 35 is formed of a rectangular metal plate or a carbon plate which extends longitudinally in the B direction. In addition, in the example of FIG. 2, the separator plate 35 is formed with an external form in a front view which is equal to the solid polymer electrolyte membrane 31. The separator plate 35 is superimposed on the MEA 23 when viewed in the A direction.

Figure 3:
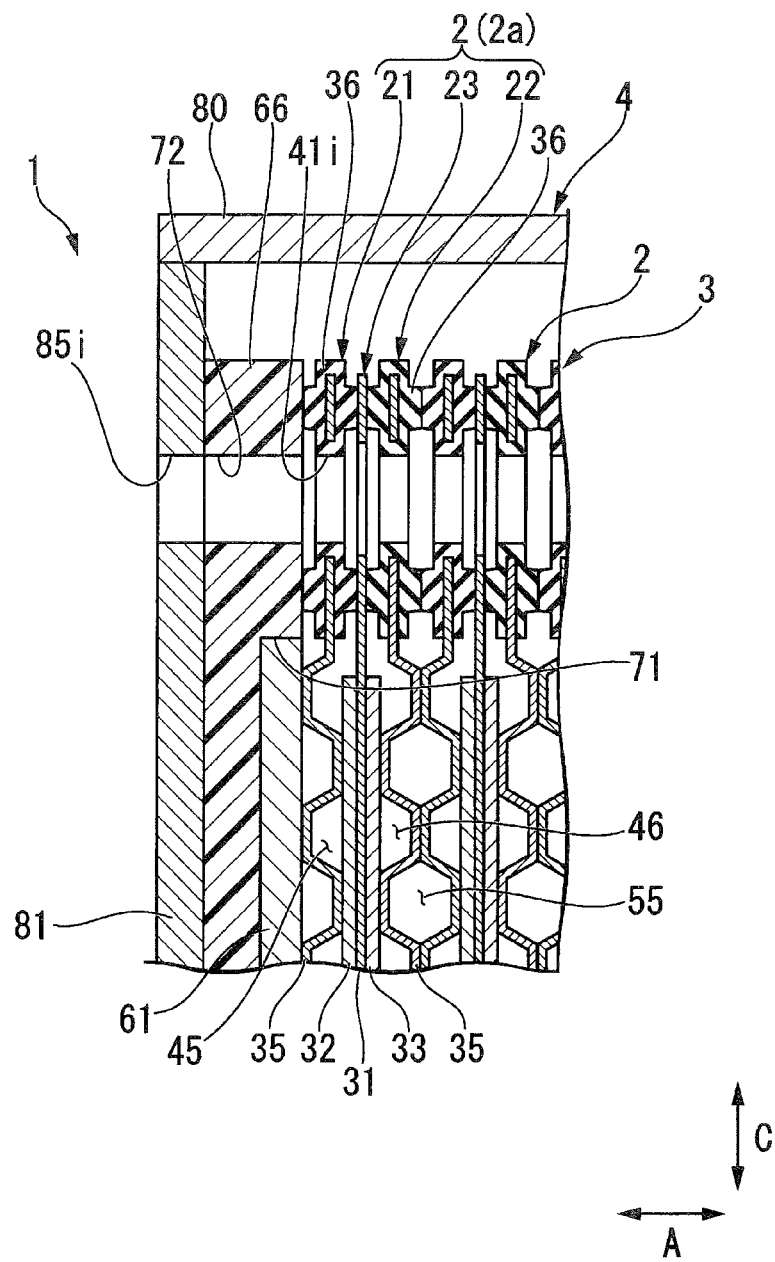
FIG. 3 is a cross sectional view taken along line III-III of FIG. 1.

FIG. 3 is a cross sectional view taken along line III-III of FIG. 1. As shown in FIG. 3, the cover member 36 is made of an elastically deformable material such as rubber and the like. The cover member 36 makes sealing contact with the outer peripheral part of the solid polymer electrolyte membrane 31 in the A direction.

As shown in FIG. 2, in each of corner parts of the unit cell 2 there are formed inlet gas communication holes (an oxidant gas inlet communication hole 41*i* and a fuel gas inlet communication hole 42*i*) and outlet gas communication holes (an oxidant gas outlet communication hole 41*o* and a fuel gas outlet communication hole 42*o*). Each of the communication holes 41*i*, 41*o*, 42*i*, 42*o* passes through the unit cells 2 in the A direction. In the example as shown in FIG. 2, in a right upper corner part of the unit cell 2 there is formed the oxidant gas inlet communication hole 41*i* for supplying the oxidant gas (for example, air or the like). In a right lower corner part of the unit cell 2 there is formed the fuel gas inlet communication hole 42*i* for supplying the fuel gas (for example, hydrogen or the like). Moreover, in a left lower corner part of the unit cell 2 there is formed the oxidant gas outlet communication hole 41*o* for exhausting the used oxidant gas.

In a left upper corner part of the unit cell 2 there is formed the fuel gas outlet communication hole 42*o* for exhausting the used fuel gas.

The unit cell 2 has coolant inlet communication holes 43*i* each of which is formed in a part located on the inside in the B direction with respect to each of the inlet communication holes 41*i*, 42*i*.

The unit cell 2 has coolant outlet communication holes 43*o* each of which is formed in a part located on the inside in the B direction with respect to each of the outlet communication holes 41*o*, 42*o*. Herein, the pair of coolant inlet communication holes 43*i* is arranged in positions opposed to each other in the C direction while putting the anode electrode 32 and the cathode electrode 33 therebetween, and the pair of coolant outlet communication holes 43*o* is arranged in positions opposed to each other in the C direction while putting the anode electrode 32 and the cathode electrode 33 therebetween.

The center part of each of the separators 21, 22 (separator plates 35) is formed in an uneven shape by press molding or the like. Surfaces of the separators 21, 22 facing toward the MEA 23 are formed with gas flow passages 45, 46 in cooperation with the MEA 23, respectively.

Specifically, the fuel gas flow passage 45 is formed between the surface of the first separator 21 facing toward the anode electrode 32 and the anode electrode 32 of the MEA 23. The fuel gas flow passage 45 is in communication with each of the fuel gas inlet communication hole 42*i* and the fuel gas outlet communication hole 42*o*.

The oxidant gas flow passage 46 is formed between the surface of the second separator 22 facing toward the cathode electrode 33 and the cathode electrode 33 of the MEA 23. The oxidant gas flow passage 46 is in communication with each of the oxidant gas inlet communication hole 41*i* and the oxidant gas outlet communication hole 41*o*.

As shown in FIG. 3, the cell laminate 3 is configured such that the first separator 21 of one unit cell 2 and the second separator 22 of the other unit cell 2 adjacent to the one unit cell 2 are stacked in the A direction in a superimposed condition. Then, between the first separator 21 of the one unit cell 2 and the second separator 22 of the other unit cell 2 there is formed a coolant flow passage 55. As shown in FIG. 2, the coolant flow passage 55 communicates with each of a coolant inlet communication hole 43*i* and a coolant outlet communication hole 43*o*. Herein, as a coolant flowing through the coolant flow passage 55, pure water, ethylene glycol and the like may be used properly, for example.

By the way, the stacking configuration of the unit cells 2 is not limited to the above configuration. For example, the unit cell may be configured by three separators and two MEA sheets held between each of these separators. In addition, the layout of each of communication holes may be changed in design appropriately.

As shown in FIG. 3, a first terminal plate 61 is arranged on one side in the A direction of the cell laminate 3. The first terminal plate 61 is smaller in external form in a font view than the separators 21, 22. The first terminal plate 61 is electrically conducted through the first separator 21 with the anode electrode 32 of the unit cell (hereinafter, referred to as a first end cell 2a) located on one side in the A direction of the cell laminate 3 (each of unit cells 2). An output terminal 63 (see FIG. 1) which projects outwardly in the A direction is formed in the first terminal plate 61.

On the outside in the A direction with respect to the first terminal plate 61, a first insulator 66 is arranged. The first insulator 66 is larger in external form in a front view than the first terminal plate 61. In addition, the first insulator 66 is thicker in thickness in the A direction than the first terminal plate 61.

In a center part of the first insulator 66 there is formed an accommodation part 71 which is recessed toward the outside in the A direction. The above referred first terminal plate 61 is accommodated in the accommodation part 71. An outer peripheral part of the first insulator 66 (a part located on the outside of the accommodation part 71) is fitted closely to the first separator 21 (cover member 36) of the first end cell 2a from outside in the A direction. In the outer peripheral part of the first insulator 66 there are formed an oxidant gas inlet connection hole 72 and a fuel gas inlet connection hole (not shown) each of which communicates with each of the above referred gas inlet communication holes 41i, 42i. Moreover, in the outer peripheral part of the first insulator 66 there are formed an oxidant gas outlet connection hole (not shown) and a fuel gas outlet connection hole (not shown) each of which communicates with each of the above referred gas outlet communication holes 41o, 42o.

Figure 4:
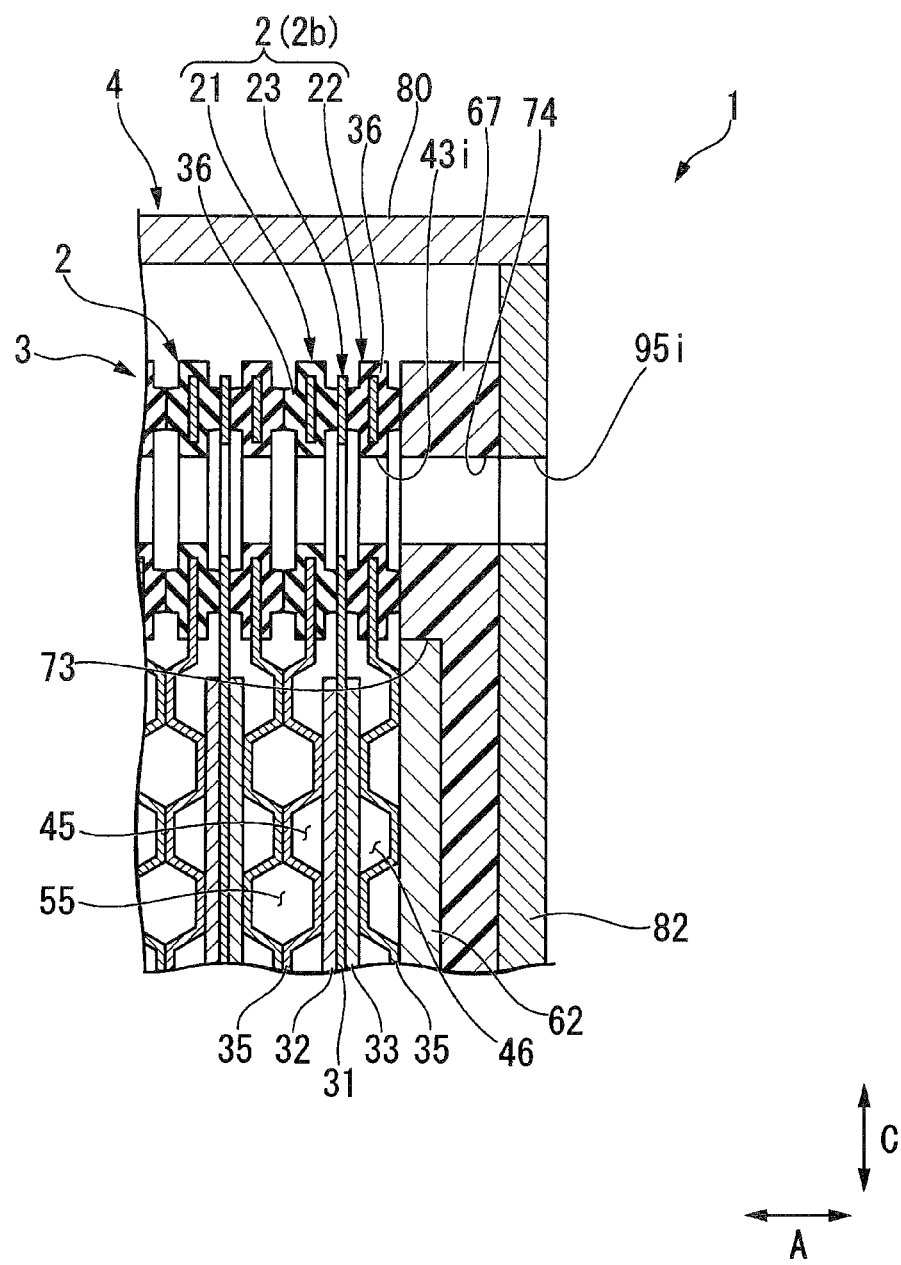
FIG. 4 is a cross sectional view taken along line IV-IV of FIG. 5.
Figure 5:
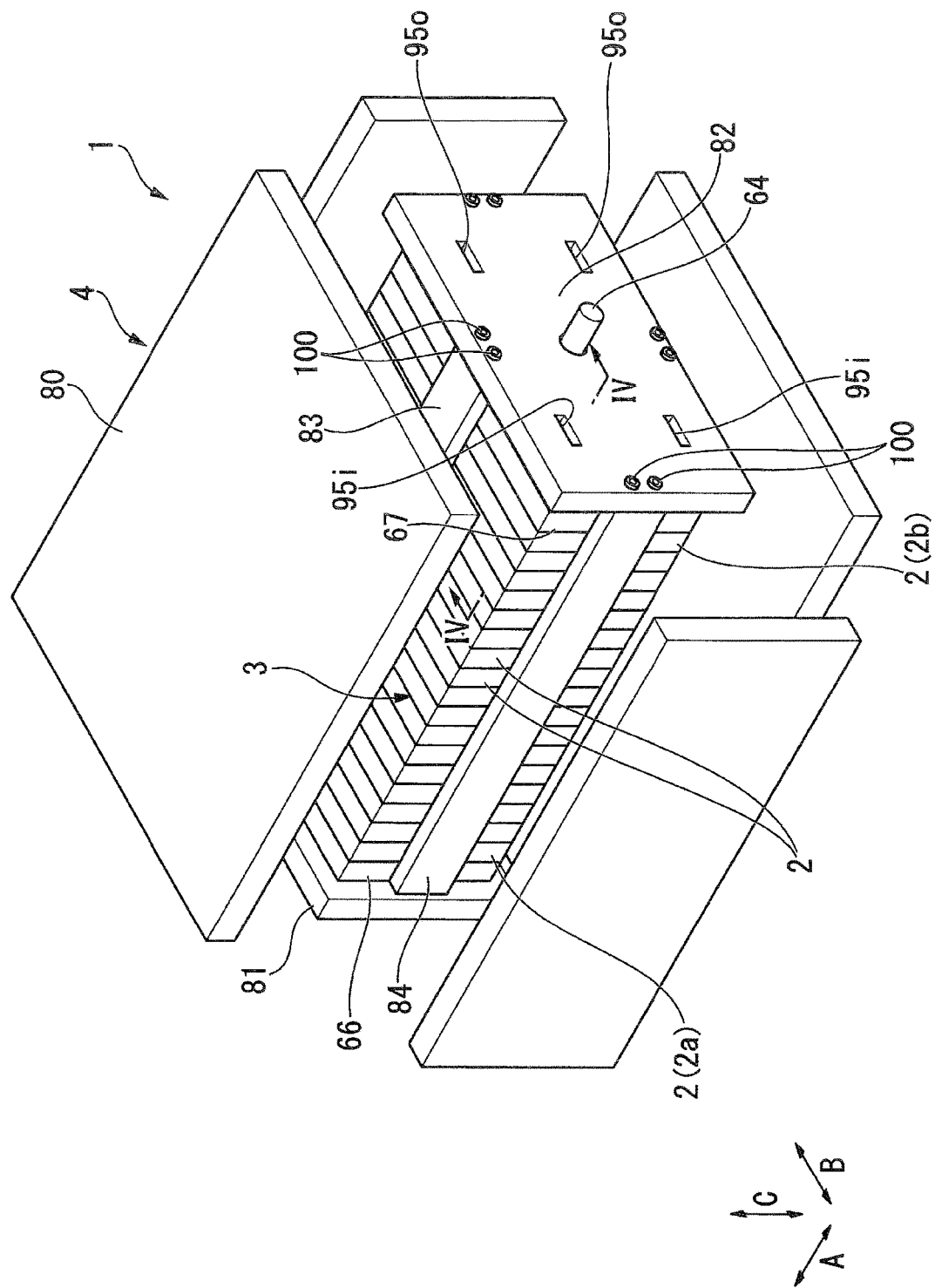
FIG. 5 is an exploded perspective view of the fuel cell stack of the embodiment when viewed from a second end plate side.

FIG. 4 is a cross sectional view taken along line IV-IV of FIG. 5.

As shown in FIG. 4, a second terminal plate 62 is arranged on the other side in the A direction with respect to the cell laminate 3. The second terminal plate 62 is electrically conducted through the second separator 22 with the cathode electrode 33 of the unit cell (hereinafter, referred to as a second end cell 2b) located on the other side in the A direction of each of unit cells 2. An output terminal (see FIG. 5) which projects outwardly in the A direction is formed in the second terminal plate 62.

On the outside in the A direction with respect to the second terminal plate 62, a second insulator 67 is arranged. The second insulator 67 is larger in external form in a front view than the second terminal plate 62. In addition, the second insulator 67 is thicker in thickness in the A direction than the second terminal plate 62.

In a center part of the second insulator 67 there is formed an accommodation part 73 which is recessed toward the outside in the A direction. The above referred second terminal plate 62 is accommodated in the accommodation part 73. An outer peripheral part of the second insulator 67 (a part located on the outside of the accommodation part 73) is fitted closely to the second separator 22 (cover member 36) of the second end cell 2b from outside in the A direction. Further, in the outer peripheral part of the second insulator 67 there are formed a coolant inlet connection hole 74 and a coolant outlet connection hole (not shown) each of which communicates with each of the above referred coolant communication holes 43i, 43o.

<Casing>

As shown in FIG. 1, the casing 4 is formed in a box shape which is a size larger than the cell laminate 3. The casing 4 houses the cell laminate 3 therein. Specifically, the casing 4 is composed of the first end plate 81 and the second end plate 82 for sandwiching the cell laminate 3 therebetween from both sides in the A direction, the first connection bar 83 and the second connection bar 84 for separately connecting opposed sides in the A direction of the end plates 81, 82, and four side panels 80 which surround the periphery of the cell laminate 3.

As shown in FIGS. 3 and 4, the end plates 81, 82 are formed in a rectangular shape which is larger in external form in a front view than the unit cell 2. A shown in FIG. 3, the first end plate 81 is arranged on one side in the A direction with respect to the cell laminate 3 in such a condition as to sandwich the first terminal plate 61 and the first insulator 66 between itself and the cell laminate 3. Herein, the end plates 81, 82 are formed by casting or the like.

As shown in FIG. 1, gas inlet holes (an oxidant gas inlet hole 85i and a fuel gas inlet hole 86i) and gas outlet holes (an oxidant gas outlet hole 85o and a fuel gas outlet hole 86o) are formed in each corner part of the first end plate 81. The gas inlet holes 85i, 86i communicate through each of the corresponding gas inlet connection holes (for example, the oxidant gas inlet connection hole 72) of the first insulator with the gas inlet communication holes 41i, 42i, respectively. The gas outlet holes 85o, 86o communicate through each of the corresponding gas outlet connection holes of the first insulator 66 with the gas outlet communication holes 41o, 42o, respectively.

As shown in FIG. 4, the second end plate 82 is arranged on the other side in the A direction with respect to the cell laminate 3 in such a condition as to sandwich the second terminal plate 62 and the second insulator 67 between itself and the cell laminate 3.

FIG. 5 is an exploded perspective view of the fuel cell stack 1 when viewed from the side of the second end plate 82.

As shown in FIG. 5, in the second end plate 82 there are formed a pair of coolant inlet holes 95i and a pair of coolant outlet holes 95o. The coolant inlet holes 95i communicate through the corresponding coolant inlet connection hole 74 (see FIG. 4) of the second insulator 67 with the coolant inlet communication hole 43i. The coolant outlet holes 95o communicate through the corresponding coolant outlet connection hole of the second insulator 67 with the coolant outlet communication hole 43o.

As shown in FIG. 1, the first connection bar 83 and the second connection bar 84 are formed in a plate shape which extends along the A direction. Herein, a cross sectional shape of each connection bar 83, 84 may be properly changed into a square shape, a circular shape or the like.

Each of the connection bars 83, 84 is fastened to the end plates 81, 82 respectively by a pair of fastening members 100 in such a condition that both end surfaces in the A direction thereof are brought into contact with inner end surfaces in the A direction of each end plate 81, 82, respectively. Specifically, long side portions of each of the end plates 81, 82 are connected to each other by the first connection bar 83 on both sides in the C direction with respect to the cell laminate 3. Short side portions of each of the end plates 81, 82 are connected to each other by the second connection bar 84 on both sides in the B direction with respect to the cell laminate 3. Herein, three or more fastening members 100 may be provided for each of the connection bars 83, 84.

Each of the side panels 80 is arranged around the cell laminate 3 (on the outside in the B direction and on the outside in the C direction), respectively. Each of the side panels 80 surrounds the cell laminate 3, the terminal plates 61, 62 and the insulators 66, 67, the end plates 81, 82, and the connection bars 83, 84 from outside in the B direction and from outside in the C direction.

The fastening configuration between each of the end plates 81, 82 and each of the connection bars 83, 84 will be described in detail hereunder. Herein, all of the fastening configurations between each of the end plates 81, 82 and each of the connection bars 83, 84 have the same configuration. Therefore, in the following description, the fastening configuration between the first end plate 81 and the first connection bar 83 will be described mainly, and the description of the fastening configurations with respect to other parts will be omitted.

Figure 6:
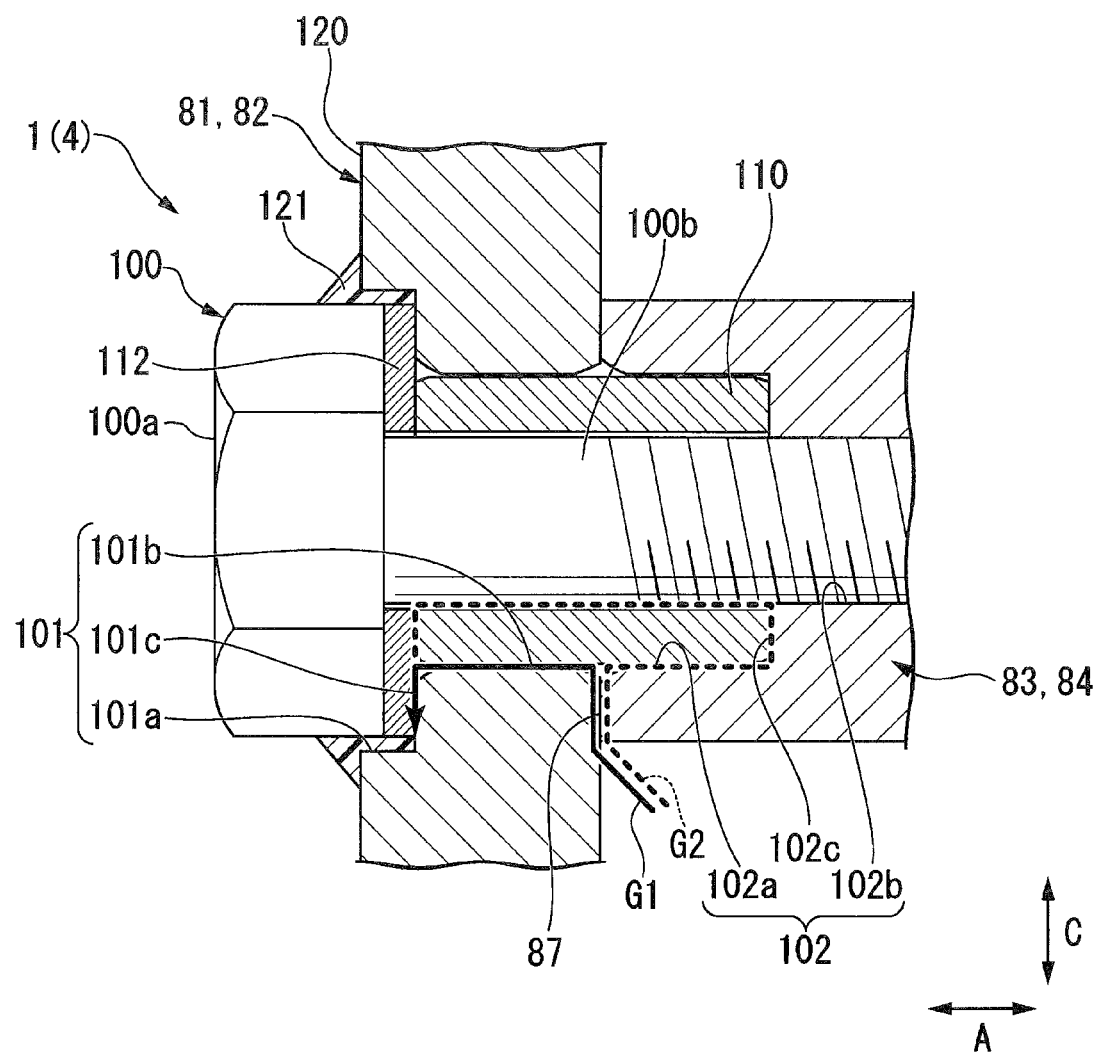
FIG. 6 is a cross sectional view taken along line VI-VI of FIG. 1.

FIG. 6 is a cross sectional view taken along line VI-VI of FIG. 1.

As shown in FIG. 6, in an overlapping part of the first end plate 81 with the first connection bar 83 when viewed from the A direction, there is formed an end plate mounting hole 101. The end plate mounting hole 101 is a circular through hole which passes through the first end plate 81 in the A direction. The end plate mounting hole 101 has a multistage form which becomes smaller in inner diameter as being located toward the inside in the A direction. Specifically, the end plate mounting hole 101 has an end plate large diameter part 101*a* which is located on the outside in the A direction and an end plate small diameter part 101*b* which extends inwardly in the A direction from the end plate large diameter part 101*a*. Herein, in this embodiment, two end plate mounting holes 101 are formed while leaving a space in the B direction therebetween.

A length in the A direction of the end plate large diameter part 101*a* is shorter than the end plate small diameter part 101*b*. Chamfering is performed on at least both end opening edges in the A direction of the end plate small diameter part 101*b* among opening edges of the end plate mounting hole 101. Round chamfering or flat chamfering may be applied to the chamfering.

A connection bar mounting hole 102 is formed in an overlapping part of the first connection bar 83 with the end plate mounting hole 101 when viewed from the A direction. The connection bar mounting hole 102 extends along the A direction and opens at an outer end surface 87 in the A direction of the first connection bar 83. An outer opening part in the A direction of the connection bar mounting hole 102 is in communication with the end plate mounting hole 101.

The connection bar mounting hole 102 has a multistage form which becomes smaller in inner diameter as being located toward the inside in the A direction. Specifically, the connection bar mounting hole 102 has a connection bar large diameter part 102*a* which is located on the outside in the A direction and a connection bar small diameter part 102*b* which extends inwardly in the A direction from the connection bar large diameter part 102*a*.

An inner diameter of the connection bar large diameter part 102*a* is equal to an inner diameter of the end plate small diameter part 101*b*.

At least the connection bar small diameter part 102*b* of the connection bar mounting hole 102 is formed into an internally threaded hole. Herein, a chamfer is formed on at least an outer opening edge in the A direction of the connection bar large diameter part 102*a* of the connection bar mounting hole 102. A round chamfer or a flat chamfer may be employed as the chamfer.

A cylindrical knock 110 is inserted into each of the mounting holes 101, 102. The cylindrical knock 110 is configured to perform positioning between the first end plate 81 and the first connection bar 83 and bear a shearing load acting between the first end plate 81 and the first connection bar 83. The cylindrical knock 110 is formed in a tubular shape extending in the A direction.

The cylindrical knock 110 is arranged so as to extend across an interior of the end plate small diameter part 101*b* and an interior of the connection bar large diameter part 102*a*. In this embodiment, a length in the A direction of the cylindrical knock 110 is equal to a total length in the A direction of the end plate small diameter part 101*b* and the connection bar large diameter part 102*a*. An inner end surface in the A direction of the cylindrical knock 110 is brought into contact with a connection bar connecting surface 102*c* between the connection bar large diameter part 102*a* and the connection bar small diameter part 102*b*, from outside in the A direction. On the other hand, an outer end surface in the A direction of the cylindrical knock 110 is located in a position equal to an end plate connecting surface 101*c* between the end plate large diameter part 101*a* and the end plate small diameter part 101*b*. Herein, the length in the A direction of the cylindrical knock 110 may be changed properly on condition that it is equal to or less than the total length in the A direction of the end plate small diameter part 101*b* and the connection bar large diameter part 102*a*.

Further, an outer diameter of the cylindrical knock 110 is smaller than inner diameters of the end plate small diameter part 101*b* and the connection bar large diameter part 102*a*. In addition, an inner diameter of the cylindrical knock 110 is not less than an inner diameter of the connection bar small diameter part 102*b*.

The fastening member 100 is screwed into the connection bar mounting hole 102 through the end plate mounting hole 101. Specifically, A head part 100*a* of the fastening member 100 makes contact with the end plate connecting surface 101*c* from outside in the A direction while locating a washer 112 between itself and the end plate connecting surface. In this case, the washer 112 and a portion of the head part 100*a* are accommodated in the end plate large diameter part 101*a*. Accordingly, an amount in the A direction of the head part 100*a* projecting outwardly from the first end plate 81 is restrained. Herein, for example, a hexagonal bolt is used preferably for the fastening member 100 of this embodiment. However, the fastening member 100 is not limited to the hexagonal bolt, and a bolt with a hexagonal hole and the like may be employed.

A shaft part 100*b* of the fastening member 100 is smaller in outer diameter than the inner diameter of the cylindrical knock 110. The shaft part 100*b* passes through an interior of the cylindrical knock 110 within each of the mounting holes 101, 102. A distal end portion of the shaft part 100*b* is screwed into the connection bar small diameter part 102*b*.

Further, a seal member 121 is provided between an outer end surface 120 in the A direction of the first end plate 81 and the head part 100*a* of the fastening member 100. In this embodiment, the seal member 121 is made of a liquid packing. In this embodiment, for example, a silicone-based liquid gasket (silicone-based solventless non-fluidity type) or the like may be employed properly as the seal member 121. "Three Bond 1212" made by Three Bond Co., Ltd. will be given as an example of such material.

The seal member 121 is formed by being applied so as to extend from the outer end surface 120 of the first end plate 81 to the head part 100*a* of the fastening member 100 after the fastening member 100 is assembled. Accordingly, the seal member 121 surrounds the fastening member 100 (the head part 100*a*) all over the circumference thereof and makes sealing contact at least with the outer end surface 120 of the first end plate 81 and an outer circumferential surface of the head part 100a. Accordingly, a gap between the fastening member 100 and the end plate mounting hole 101 is sealed from outside in the A direction.

In this embodiment, the seal member 121 is filled also in the end plate large diameter part (seal accommodation part) 101a. Therefore, the seal member 121 makes sealing contact also with an inner surface of the end plate large diameter part 101a and an outer circumferential surface of the washer 112. Herein, the range, etc. in which the seal member 121 is formed may be changed properly on condition that the seal member is formed so as to bridge a space between the outer end surface 120 of the first end plate 81 and the fastening member 100 and configured so as to seal a gap between the fastening member 100 and the end plate mounting hole 101. For example, the seal member 121 may be located between the washer 112 and the end plate connecting surface 101c. Moreover, the seal member 121 may cover the head part 100a from outside in the A direction.

Like this, in this embodiment, the seal member 121 for sealing the gap between the fastening member 100 and the end plate mounting hole 101 is configured so as to be provided on the outer end surface 120 of the first end plate 81.

With this configuration, the reaction gas (in particular, the fuel gas) leaking out from the cell laminate 3 and existing in the casing 4 is able to be prevented from being discharged through each of the mounting holes 101, 102 into the outside of the fuel cell stack 1 (the casing 4). Specifically, the reaction gas which passes through a gap between the first end plate 81 and the first connection bar 83 and penetrates into interiors of the mounting holes 101, 102 separates into the reaction gases G1 and G2 within the mounting holes 101, 102. The reaction gas G1 flows outwardly in the A direction on the outside of the cylindrical knock 110 and, thereafter, flows through between the head part 100a of the fastening member 100 and the end plate connecting surface 101c. However, it is blocked by the seal member 121 before leaking out to the outside of the casing 4. On the other hand, the reaction gas G2 flows around the cylindrical knock 110 from the inside in the A direction and enters the inside of the cylindrical knock 110. The reaction gas G2, after having flown through between the head part 100a of the fastening member 100 and the end plate connecting surface 101c, is blocked by the seal member 121 before leaking out to the outside of the casing 4.

Further, the water and the like which exist in the exterior of the casing 4 can be blocked by the seal member 121 so as not to enter the interior of the casing 4 through the end plate mounting hole 101. In this case, since the water and the like are able to be blocked on the outside in the A direction from the boundary region between the first end plate 81 and the first connection bar 83, particularly, the corrosion of the shearing portions of the fastening member 100 and the cylindrical knock 110 corresponding to the boundary regions between the first end plate 81 and the first connection bar 83 can be suppressed.

Particularly, in this embodiment, the seal member 121 is configured so as to be provided on the outer end surface 120 of the first end plate 81.

With this configuration, different from the configuration in which, for example, the seal member (for example, O-ring or the like) is interposed between the outer circumferential surface of the cylindrical knock 110 and the inner circumferential surface of the mounting hole 101, 102, it is possible to prevent the seal member from being squeezed and damaged between the first end plate 81 and the first connection bar 83 at the time of assembly and the like. Accordingly, the assemblability of the seal member 121 may be improved, and the leak of the reaction gas to the outside of the above referred casing 4 and the penetration of the water from the outside of the casing 4 can be suppressed for a long period of time.

Particularly, since the seal member 121 is provided on the outer end surface 120 of the first end plate 81, it is possible to prevent the water and the like from penetrating into the boundary surface between the fastening member 100 (for example, made of iron) and the first end plate 81 (for example, made of aluminum). Thus, the galvanic corrosion (contact corrosion between dissimilar metals) can be prevented. As a result, a process of performing surface treatment, etc. of the fastening member 100 for preventing the galvanic corrosion can be dispensed with, so that the reduction in cost can be achieved.

In this embodiment, the liquid packing is employed as the seal member 121.

With this configuration, the seal member 121 can be formed by applying the liquid packing so as to range from the outer end surface 120 of the first end plate 81 to the head part 100a of the fastening member 100 after the fastening member 100 is assembled. In this case, the seal member 121 can be formed merely by applying a predetermined amount of liquid packing to a predetermined position, for example, by using a dispenser device or the like. Therefore, it is possible to improve manufacturing efficiency and to realize the reduction in cost as compared with the configuration in which the O-ring or the like is interposed between the outer circumferential surface of the cylindrical knock 110 and the inner circumferential surface of the mounting hole 101, 102, for example.

In this embodiment, since a portion of the seal member 121 is accommodated in the end plate large diameter part 101a, a contact area of the first end plate 81 and the fastening member 100 with the seal member 121 can be increased. Therefore, the seal member 121 can be securely held on the outer end surface 120 of the first end plate 81, and the sealability between the mounting hole 101, 102 and the fastening member 100 can be further improved.

Further, since the end plate large diameter part 101a can be used for positioning and flow stopping of the seal member 121 at the time of forming the seal member 121, the further improvement of the manufacturing efficiency can be achieved.

First Modified Example

Figure 7:
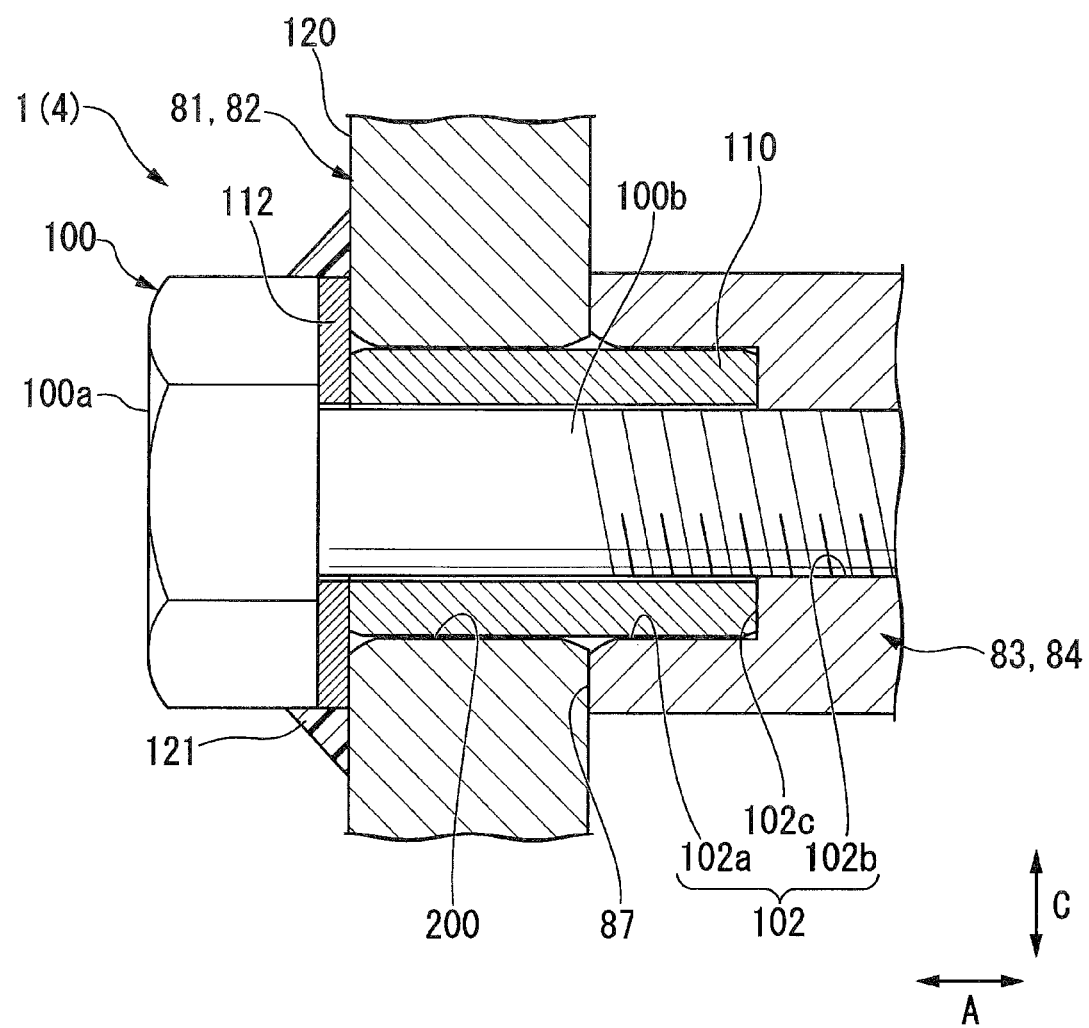
FIG. 7 is a cross sectional view corresponding to FIG. 6 in accordance with a first modified example of the embodiment.
Figure 8:
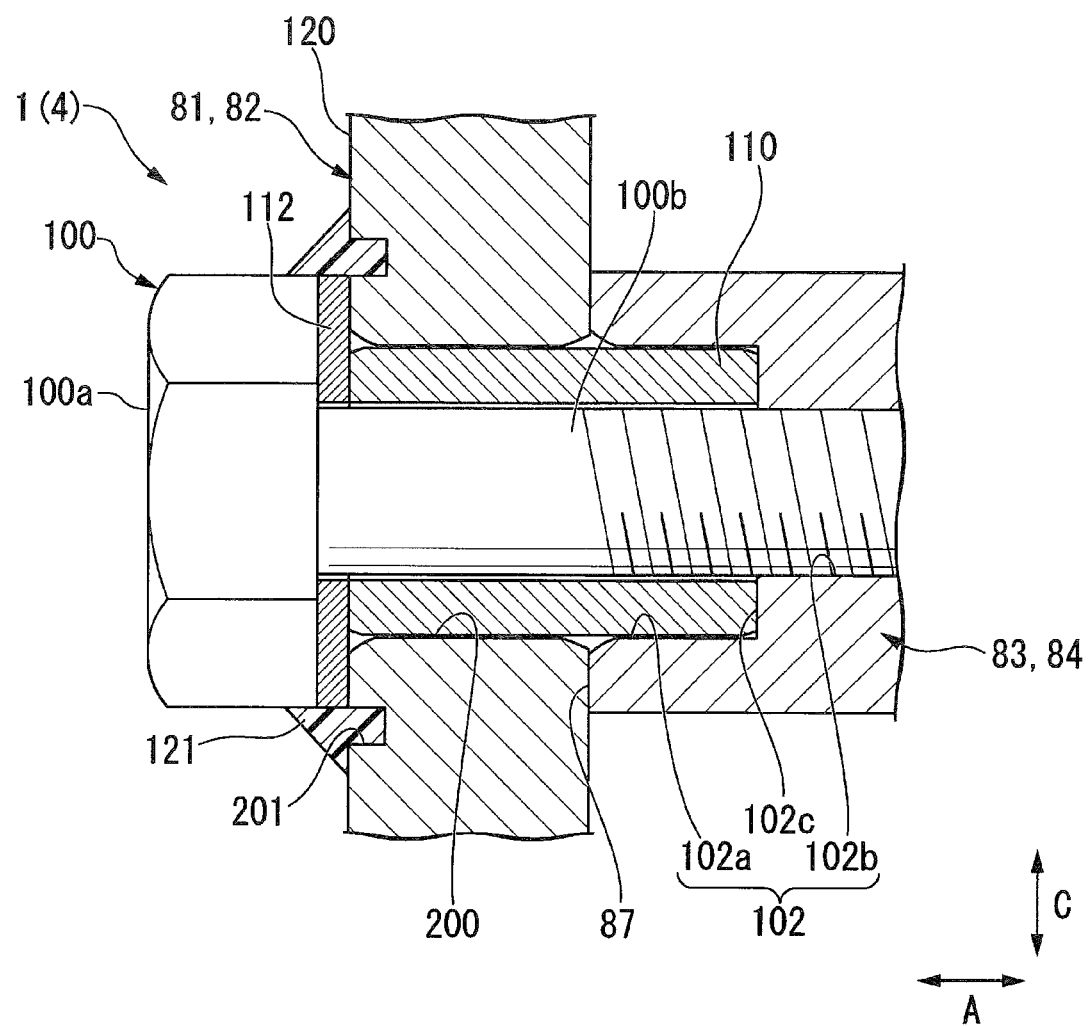
FIG. 8 is a cross sectional view corresponding to FIG. 6 in accordance with the first modified example of the embodiment.

Next, a first modified example of the above referred embodiment will be explained. In the following description, component elements identical to those of the above referred embodiment are given like reference characters, and the description thereof will be omitted. FIGS. 7 and 8 are cross sectional views corresponding to FIG. 6 in accordance with the modified example.

In the above referred embodiment, although the description has been made with respect to the case where the end plate mounting hole 101 is formed in a multistage shape, the configuration is not limited to only that case. As shown in FIGS. 7 and 8, an end plate mounting hole 200 may be formed with a uniform inner diameter all over in the A direction. In the example shown in the drawings, the inner diameter of the end plate mounting hole 200 is formed so as to be equal to an inner diameter of the connection bar large diameter part 102a.

Also in such case, as shown in FIG. 7, the seal member 121 may be interposed between the outer end surface 120 of the first end plate 81 and the fastening member 100 (the head part 100a).

Further, as shown in FIG. 8, a seal accommodation part 201 for accommodating the seal member 121 may be formed in the outer end surface 120 of the first end plate 81. The seal accommodation part 201 is recessed inwardly in the A direction in the outer end surface 120 of the first end plate 81. In addition, the seal accommodation part 201 is formed in an annular shape which surrounds a circumference of the fastening member 100 on the outside of the fastening member 100 in a front view as seen in the A direction. A portion of the seal member 121 is accommodated in the seal accommodation part 201.

Herein, the seal accommodation part 201 may be properly changed on condition that it is able to accommodate at least a portion of the seal member 121. For example, the seal accommodation part 201 is not limited to an annular shape but may be formed intermittently around the fastening member 100. Further, a cross sectional shape of the seal accommodation part 201 is not limited to a square shape but may be a circular shape or a triangular shape or the like. In addition, an undercut for anchoring the seal member 121 may be provided in an inner surface of the seal accommodation part 201. Further, the seal accommodation part 201 may be arranged in a position in which a portion thereof overlaps with the head part 100a of the fastening member 100 in a front view.

Second Modified Example

Figure 9:
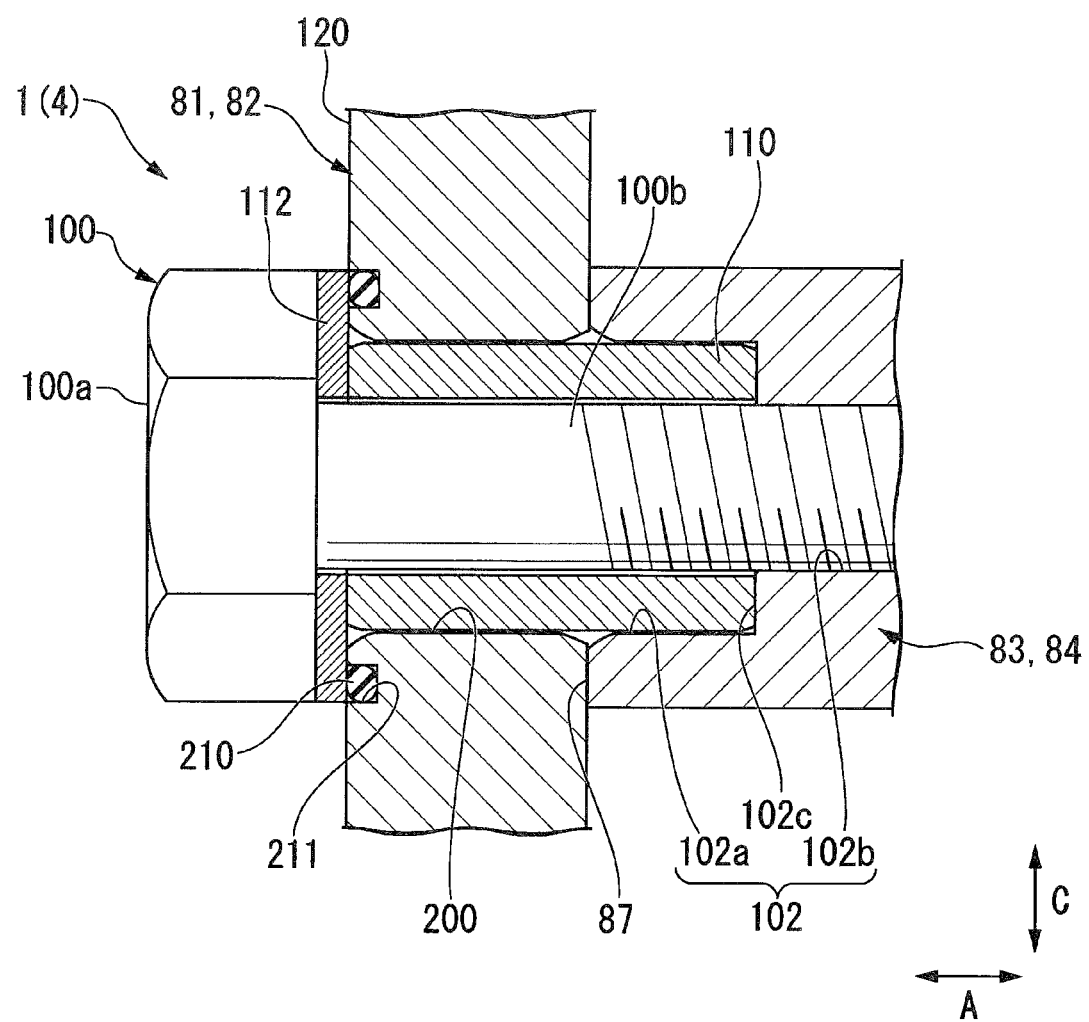
FIG. 9 is a cross sectional view corresponding to FIG. 6 in accordance with a second modified example of the embodiment.
Figure 10:
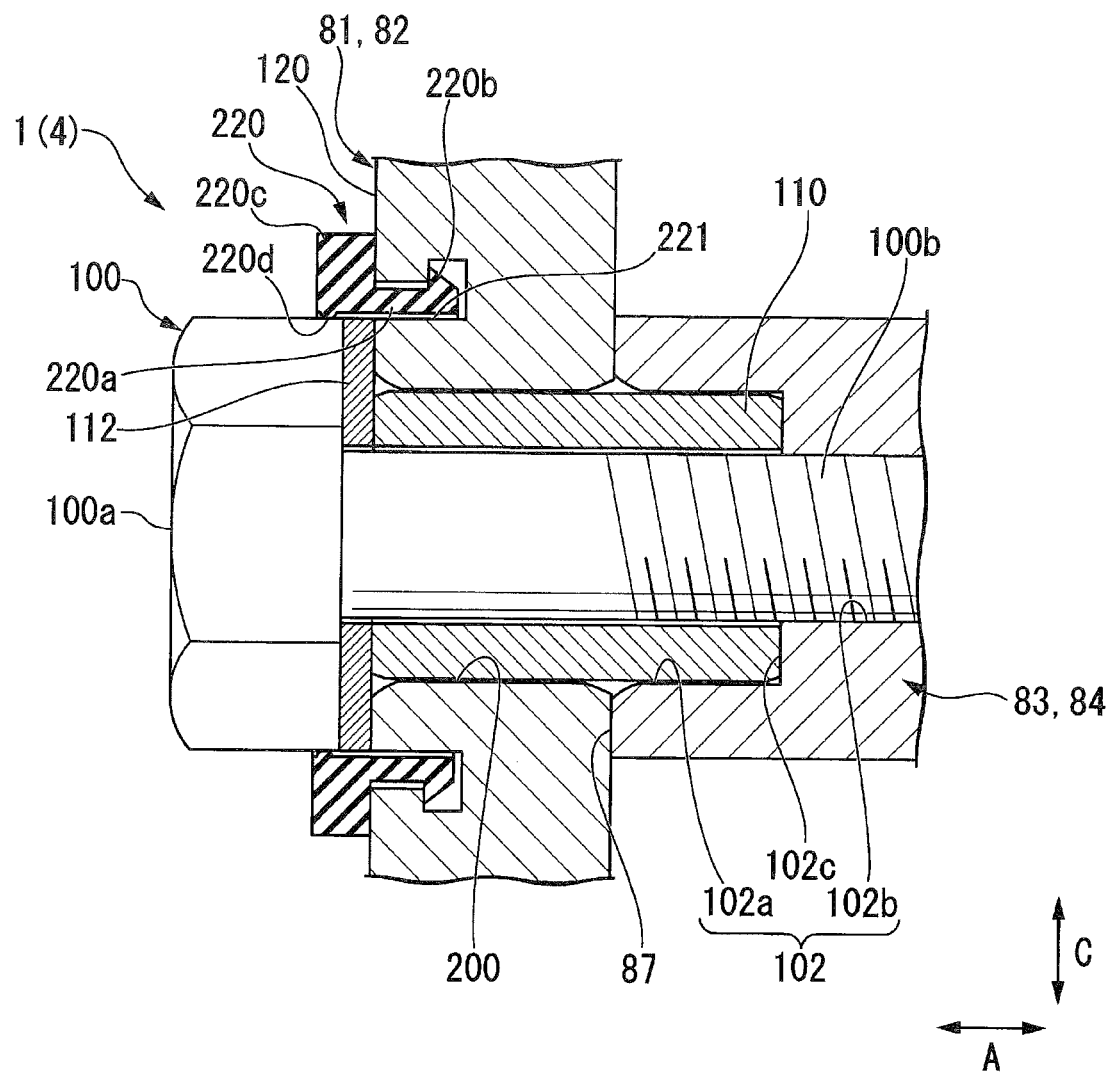
FIG. 10 is a cross sectional view corresponding to FIG. 6 in accordance with the second modified example of the embodiment.

Next, a second modified example will be described. In the following description, component elements identical to those of the above referred embodiment and the first modified example are given like reference characters, and the description thereof will be omitted. FIGS. 9 and 10 are cross sectional views corresponding to FIG. 6 in accordance with the modified example. In the configuration as shown in the above referred FIGS. 6 to 8, although the configuration in which the liquid packing is employed as the seal member 121 is described, the configuration is not limited to only that. For example, as shown in FIGS. 9, 10 and the like, a seal member 210 may be made of elastic materials such as rubber and the like.

As shown in FIG. 9, a seal accommodation part 211 which is recessed inwardly in the A direction is formed in a position overlapping with the head part 100a in a front view, in the outer end surface 120 of the first end plate 81. The seal accommodation part 211 is formed in an annular shape which surrounds the shaft part 100b of the fastening member 100. The seal member 210 is accommodated in the seal accommodation part 211.

The seal member 210 is formed in an annular shape an axial direction of which is the A direction. The seal member 210 is held between an inner surface of the seal accommodation part 211 and an inner end surface in the A direction of the washer 112, so that it is accommodated within the seal accommodation part 211 in a compressed and deformed condition in the A direction. Therefore, the seal member 210 makes sealing contact with the inner surface of the seal accommodation part 211 and the inner end surface in the A direction of the washer 112 whereby to seal a gap between the fastening member 100 and the outer end surface 120 of the first end plate 81. Herein, although the seal member 210 is formed in a circular shape in longitudinal cross section along the A direction, it may be formed in a square shape or the like without being limited to the circular shape.

In a configuration as shown in FIG. 10, a seal accommodation part 221 which is recessed inwardly in the A direction is formed in a region of the outer end surface 120 of the first end plate 81, which is located outside from the fastening member 100 in a front view. The seal accommodation part 221 is formed in an annular shape which surrounds the circumference of the fastening member 100 in a front view.

A seal member 220 is formed in a cylindrical shape an axial direction of which is the A direction. Specifically, the seal member 220 has a cylindrical part 220a, an engaging part 220b formed in an inner end portion in the A direction of the cylindrical part 220a, a flange part 220c and a contact part 220d formed in an outer end portion in the A direction of the cylindrical part 220a and a contact part 220d.

The cylindrical part 220a is inserted into the seal accommodation part 221 from outside in the A direction. The engaging part 220b projects outwardly in a radial direction of the cylindrical part 220a from the inner end portion in the A direction of the cylindrical part 220a. The engaging part 220b is in undercut engagement with the inner surface of the seal accommodation part 221 within the seal accommodation part 221.

The flange part 220c projects outwardly in the radial direction of the cylindrical part 220a from the outer end portion in the A direction of the cylindrical part 220a. The flange part 220c extends along the outer end surface 120 of the first end plate 81.

The contact part 220d projects inwardly in the radial direction of the cylindrical part 220a from the outer end portion in the A direction of the cylindrical part 220a. The contact part 220d makes sealing contact with the outer circumferential surface of the head part 100a of the fastening member 100 all over the circumference.

By the way, it is to be understood that the technical scope of the present invention is not limited to the above referred embodiments but may include various changes and modifications of each of the above described embodiments without departing from the spirit and scope of the invention.

For example, in the above referred embodiments, the configuration in which the seal accommodation part is formed so as to be recessed inwardly in the A direction from the outer end surface of the first end plate 81, is described, but it is not limited only to such configuration. There may be provided a projecting part which projects outwardly in the A direction from the outer end surface so as to hold the seal member.

Further, the liquid packing and the like may be located in the boundary surface between the end plate and the connection bar.

In the above referred embodiment, the configuration in which the cylindrical knock 110 is fitted on the shaft part 100b of the fastening member 100 from outside is described, but the configuration in which the cylindrical knock 110 is not provided may be employed.

Further, the configuration of the seal member may be properly changed without being limited to the above embodiment and each of the modified examples.

In addition, without departing from the spirit of the present invention, it is possible to replace the component elements in the above described embodiment with the known component parts, and it is possible to combine the above referred modified examples appropriately.

DESCRIPTION OF REFERENCE CHARACTERS

1: Fuel cell stack, 2: Unit cell (fuel cell), 3: Cell laminate, 81: First end plate, 82: Second end plate, 83: First connection bar (connecting member), 84: Second connection bar (connecting member), 100: Fastening member, 101a: End plate large diameter part (seal accommodation part), 120: Outer end surface, 121: Seal member, 201: Seal accommodation part, 210: Seal member, 211: Seal accommodation part, 220: Seal member, 221: Seal accommodation part A fuel cell stack according to a first feature of the present invention, includes a cell laminate (for example, a cell laminate 3 in an embodiment) in which a plurality of fuel cells (for example, unit cells 2 in the embodiment) are stacked in a first direction, a casing (for example, a casing 4 in the embodiment) for accommodating the cell laminate, having a pair of end plates (for example, a first end plate 81 and a second end plate 82 in the embodiment) which holds the cell laminate from both sides in the first direction and a connecting member (for example, a first connection bar 83 and a second connection bar 84 in the embodiment) which extends between the pair of end plates, a fastening member (for example, a fastening member 100 in the embodiment) for fastening the end plates and the connecting member in the first direction, and a seal member (for example, a seal member 121 in the embodiment) which is provided on an outer end surface (for example, an outer end surface 120 in the embodiment) of the end plate located on an opposite side of the cell laminate in the first direction so as to provide a seal between the outer end surface and the fastening member.

According to a second feature of the present invention, the seal member is a liquid packing. The seal member may surround a circumference of the fastening member all over thereof and make sealing contact with the outer end surface of the end plate and an outer circumferential surface of the fastening member.

According to a third feature of the present invention, the outer end surface of the end plate may be formed with a seal accommodation part (for example, an end plate large diameter part 101a in the embodiment) which is recessed in the direction facing toward the cell laminate in the first direction and holds at least a portion of the seal member.

EFFECT OF THE INVENTION

According to the first feature of the present invention, the reaction gas (in particular, fuel gas) which leaks out from the cell laminate and exists within the casing may be prevented by the seal member from being discharged into an outside of the fuel cell stack (casing) through the mounting holes of the end plates and the connecting member, into which the fastening members are inserted.

Further, water and the like which exists in the outside of the casing may be prevented by the seal member from penetrating into the casing through the mounting holes. In this case, since the water and the like can be blocked at the outer end surface of the end plate, the penetration of the water and the like into a boundary region between the end plate and the connecting member may be surely suppressed. As a result, it is possible to suppress corrosion of a shearing portion of the fastening member located in the boundary region between the end plate and the connecting member, for example.

Particularly, since the seal member is provided on the outer end surface of the end plate, different from such a configuration that the seal member (for example, O-ring or the like) is arranged between an outer circumferential surface of the fastening member and an inner circumferential surface of the mounting hole for example, it is possible to prevent the seal member from being squeezed and damaged between the end plate and the connecting member at the time of assembly and the like. Accordingly, the assemblability of the seal member may be improved and the leak of the reaction gas to the outside of the casing and the penetration of the water from the outside of the casing may be suppressed for a long period of time.

According to the second feature of the present invention, the seal member may be formed by applying a liquid packing so as to range from the outer end surface of the end plate to the fastening member after the fastening member is assembled. In this case, the seal member may be formed merely by applying a predetermined amount of liquid packing to a predetermined position, for example, by using a dispenser device or the like. Therefore, it is possible to improve manufacturing efficiency and to realize a reduction in cost as compared with the configuration in which the O-ring or the like is interposed between the outer circumferential surface of the fastening member and the inner circumferential surface of the mounting hole, for example.

According to the third feature of the present invention, since a portion of the seal member is accommodated in the seal accommodation part, a contact area of the end plate and the fastening member with the seal member may be increased. Therefore, the seal member may be securely held on the outer end surface of the end plate.

Further, particularly, in the case of using the liquid packing for the seal member, since the seal accommodation part is able to be used for positioning and flow stopping of the seal member at the time of forming the seal member, the further improvement of the manufacturing efficiency may be achieved.

Obviously, numerous modifications and variations of the present invention are possible in light of the above teachings. It is therefore to be understood that within the scope of the appended claims, the invention may be practiced otherwise than as specifically described herein.

What is claimed is:

1. A fuel cell stack comprising:
   a cell laminate in which a plurality of fuel cells is stacked in a first direction;
   a casing for accommodating the cell laminate, having a pair of end plates which holds the cell laminate from both sides in the first direction and a connecting member which extends between the pair of end plates;
   a fastening member for fastening the end plates and the connecting member in the first direction; and
   a seal member which is provided on an outer end surface of the end plate located on an opposite side of the cell laminate in the first direction so as to provide a seal between the outer end surface and the fastening member,
   wherein the seal member makes sealing contact with the outer end surface of the end plate and an outer circumferential surface of the fastening member.

2. A fuel cell stack according to claim 1, wherein the seal member is a liquid packing, and the seal member surrounds all over a circumference of the fastening member.

3. A fuel cell stack according to claim 1, wherein the outer end surface of the end plate is formed with a seal accommodation part which is recessed in the direction facing toward the cell laminate in the first direction so as to hold at least a portion of the seal member.

4. A fuel cell stack according to claim 1, wherein the outer end surface of the end plate is an outermost end surface of the end plate.

5. A fuel cell stack according to claim 4, wherein the seal member directly contacts the outermost end surface of the end plate.

6. A fuel cell stack according to claim 1, wherein the seal member extends about an entire outer perimeter of the outer circumferential surface of the fastening member and the seal member at least partially covers the outer circumferential surface of the fastening member about the entire outer perimeter.

7. A fuel cell stack comprising:
a cell laminate including fuel cells stacked in a stacking direction;
a casing accommodating the cell laminate therein and comprising:
a first end plate and a second end plate sandwiching the cell laminate therebetween in the stacking direction; and
a connecting member arranged between the first end plate and the second end plate;
a first fastening member connecting the first end plate and the connecting member;
a second fastening member connecting the second end plate and the connecting member;
a first seal member provided between the first end plate and the first fastening member; and
a second seal member provided between the second end plate and the second fastening member, wherein
the first seal member is provided on a first outer end surface of the first end plate located on an opposite side of the cell laminate in the stacking direction so as to provide a seal between the first outer end surface and the first fastening member,
the second seal member is provided on a second outer end surface of the second end plate located on an opposite side of the cell laminate in the stacking direction so as to provide a seal between the second outer end surface and the second fastening member,
the first seal member and the second seal member are a liquid packing,
the first seal member surrounds all over a circumference of the first fastening member and makes sealing contact with the first outer end surface and an outer circumferential surface of the first fastening member, and
the second seal member surrounds all over a circumference of the second fastening member and makes sealing contact with the second outer end surface and an outer circumferential surface of the second fastening member.

8. A fuel cell stack according to claim 7, wherein
the first outer end surface is formed with a first seal accommodation part which is recessed in a direction facing toward the cell laminate in the stacking direction so as to hold at least a portion of the first seal member, and
the second outer end surface is formed with a second seal accommodation part which is recessed in a direction facing toward the cell laminate in the stacking direction so as to hold at least a portion of the second seal member.

9. A fuel cell stack according to claim 7, wherein
the first seal member extends about an entire outer perimeter of the outer circumferential surface of the first fastening member and the first seal member at least partially covers the outer circumferential surface of the first fastening member about the entire outer perimeter, and
the second seal member extends about an entire outer perimeter of the outer circumferential surface of the second fastening member and the second seal member at least partially covers the outer circumferential surface of the second fastening member about the entire outer perimeter.

10. A fuel cell stack comprising:
a cell laminate in which a plurality of fuel cells is stacked in a first direction;
a casing for accommodating the cell laminate, having a pair of end plates which holds the cell laminate from both sides in the first direction and a connecting member which extends between the pair of end plates;
a fastening member for fastening the end plates and the connecting member in the first direction; and
a seal member which is provided on an outer end surface of the end plate located on an opposite side of the cell laminate in the first direction so as to provide a seal between the outer end surface and the fastening member, the outer end surface of the end plate being an outermost end surface of the end plate,
wherein the outer end surface of the end plate is formed with a seal accommodation part which is recessed in the direction facing toward the cell laminate in the first direction so as to hold at least a portion of the seal member.

11. A fuel cell stack according to claim 10, wherein the seal member directly contacts the outermost end surface of the end plate.

* * * * *